Patented July 28, 1931

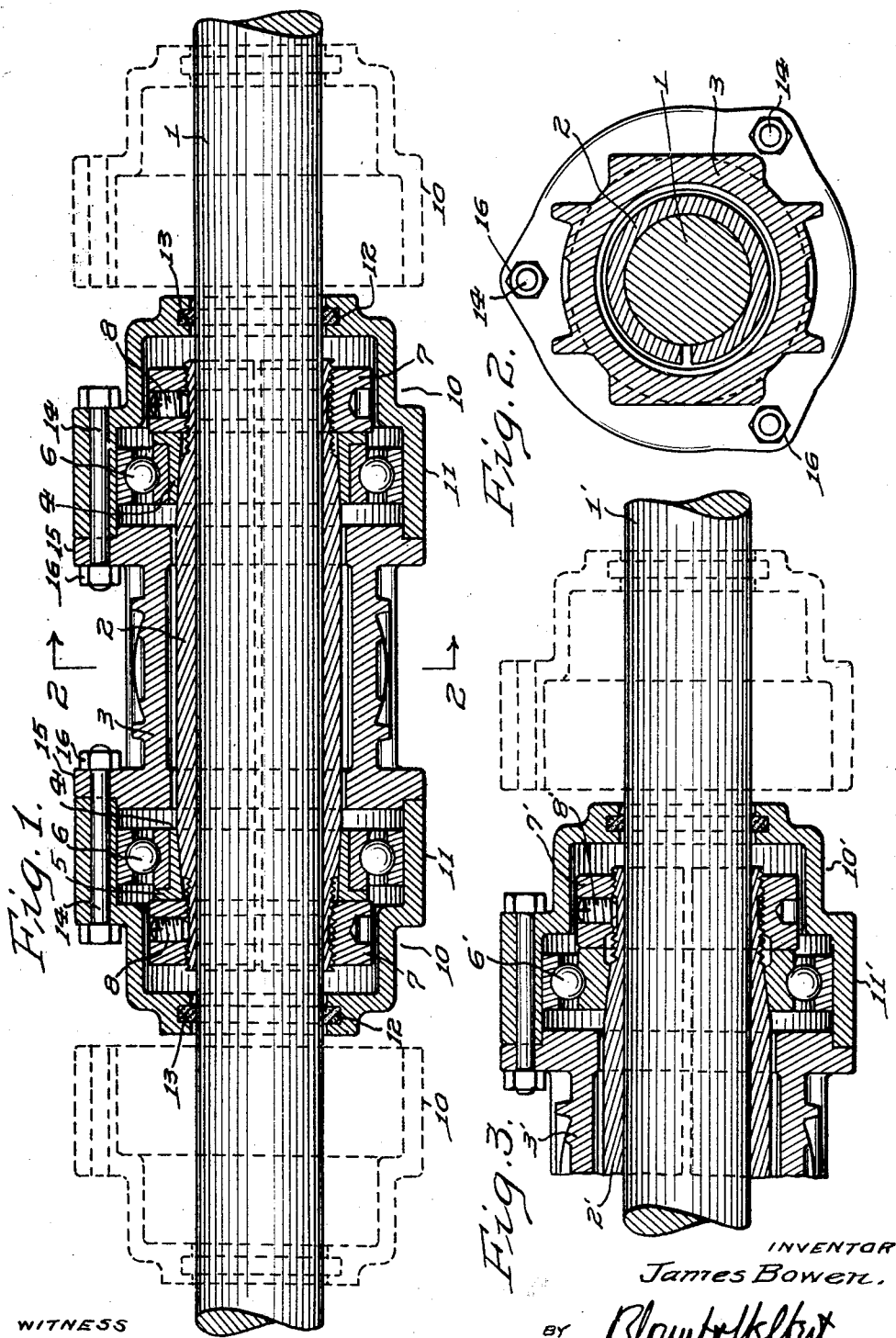

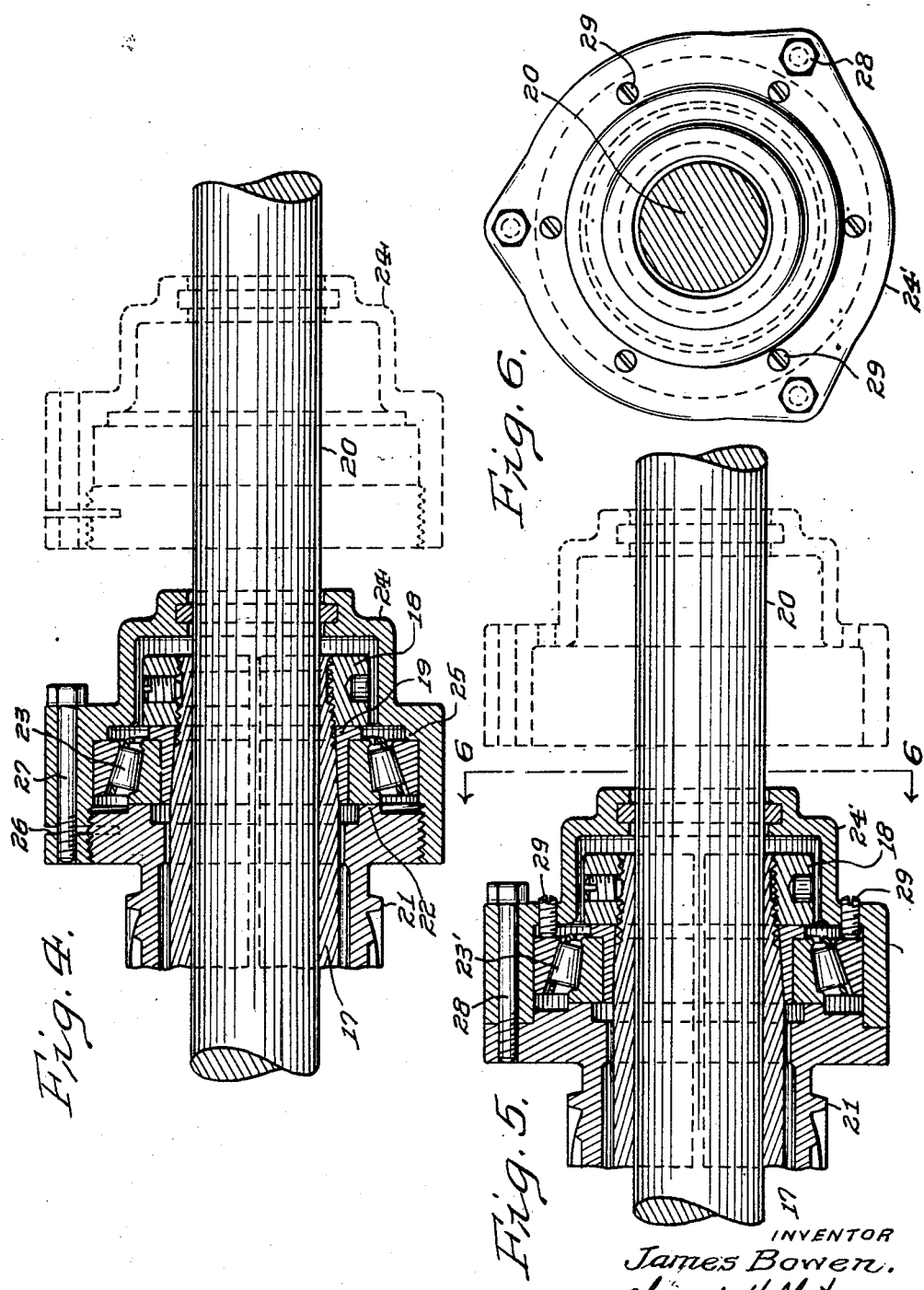

1,816,002

UNITED STATES PATENT OFFICE

JAMES BOWEN, OF MANHEIM, PENNSYLVANIA, ASSIGNOR TO BOND FOUNDRY & MACHINE COMPANY, OF MANHEIM, PENNSYLVANIA, A CORPORATION OF PENNSYLVANIA

ANTIFRICTION BEARING FOR LINE SHAFTS AND THE LIKE

Application filed October 28, 1929. Serial No. 402,865.

The present invention is directed to improvements in antifriction bearings for line shafts and the like and is especially adapted for use in hanger supports for shafts which are not machined or are inaccurately machined at the point at which it is desired to apply the bearing.

In bearings heretofore used for this purpose it has been customary to provide an adapter sleeve clamped to the bearing and enclosed by a housing mounted on the hanger and in which a ball or roller bearing assembly having especially formed races is recessed, a suitable cover or end plate being provided for maintaining the antifriction bearing assembly in proper position in the housing and for protecting the same from admission of foreign substances such as dust, corrosive fluids and the like.

Disadvantages of bearings of this form result from the difficulty of properly cleaning and inspecting the bearing due to the necessity of removing the rolling elements and races from the adapter sleeve and from the housing in order to obtain the desired access thereto, a result of such removal being that the bearing upon being reassembled must be skillfully adjusted for proper operation. Operation of the bearing is thus interrupted for a protracted period whenever such cleaning or inspection is required. Additionally, the necessity of providing especially formed and machined bearing races has been both an inconvenient and a costly factor in the installation of shafts of this type.

To avoid these and other disadvantages of bearings heretofore used and for other purposes and objects hereinafter more specifically designated, my invention provides means whereby antifriction bearings of the class described may be mounted initially with relative ease and may be thoroughly cleaned, inspected and lubricated without requiring that the bearing races be removed from their position with respect to the shaft and also without requiring any difficult adjustments of the races in assembling the bearing to resume operation after such cleaning, inspecting and lubricating have been completed. Furthermore, I have provided in the preferred form of my invention means whereby bearing races of standard forms and sizes may be employed in such shaft mountings, and inasmuch as no special forming or machining of the races is required in order to permit such employment, the initial inconvenience and expense of installing line shafts and the like is considerably reduced.

In fulfilling these and other objects of my invention as will appear more particularly from the following description, I am enabled by the use of my invention to permit adjustment of the bearings to be made finally and permanently upon the first installation of the shaft, as all operations required in the maintenance of the bearings may be carried on without disturbing the position of the bearing on the shaft, and it is therefore possible to employ relatively unskilled workers in maintaining such bearings in proper condition without the danger of undue wear, breakage or other damage which may result from improper readjustment thereof.

Describing now more particularly certain forms of my invention, reference will be had to the accompanying drawings in which Fig. 1 is a view of my preferred form of a bearing assembly partly in vertical section and partly in side elevation as applied to a shaft of a usual type; Fig. 2 is a section on the line 2—2 of Fig. 1; Fig. 3 is a fragmentary section, corresponding to Fig. 1, of a modified form of my invention; Fig. 4 is a view similar to Fig. 3 but showing a further modified form of the invention and one which is especially adapted for employment with tapered roller bearings; Fig. 5 is a similar view of a somewhat further modified form of the invention which is also particularly adapted for use with tapered cylindrical rolling elements, and Fig. 6 is an end view of the bearing assembly shown in Fig. 5 on the line 6—6 therein and in the direction of the arrows. Positions which the housing end pieces employed in my invention may assume before assembly are indicated by broken lines, and like characters are used to indicate like parts in the several figures, a prime (') being added to those in Fig. 3 to indicate parts corresponding to those in Fig. 1 and to those in Figs. 5 and 6 to designate parts corresponding to those in Fig. 4.

Referring now more particularly to Fig. 1, mounted upon the shaft 1 I employ in the preferred form of the invention herein illustrated a split cylindrical adapter sleeve 2 having an internal diameter slightly greater than that of the shaft to which it is to be applied, the external periphery of the sleeve being cylindrical in the central portion, tapering slightly toward the end and provided with threaded end portions, certain of the threads being cut away for a purpose which will hereafter appear. Surrounding but normally not in contact with the central cylindrical portion of the adapter sleeve is a central housing body 3 which may conveniently be mounted in the hanger or other suitable structure to which the bearing is secured to provide support for the shaft. The bushings 4 are of a generally annular form, internally tapered to correspond with the tapered portions of the adapter sleeve and are provided with annular rings or flanges 5. An antifriction bearing assembly is generally indicated by the numeral 6 and comprises an inner race, anti-friction rolling elements and an outer race and may be of any of various well known standard forms. It will be understood that the bearings of standard form referred to comprise a pair of concentric annular races, embracing between them rolling elements such as steel balls, cylindrical rollers or the like, the inner surface of the inner race and the outer surface of the outer race being generally cylindrical in form.

The outer cylindrical portion of the bushings 4 has a diameter only very slightly smaller than the inner diameter of the inner bearing race, so that a tight fit may be obtained when the bushing is disposed within the inner race. The bushings 4 are split longitudinally whereby slight radial expansion or compression of the sleeve is facilitated. The adapter sleeve nuts 7 are internally threaded to correspond to the threaded end portions of the adapter sleeve 2.

The bearing is accordingly finally assembled upon the shaft after the adapter sleeve is placed in position thereon within the housing 3 by placing the bearings 6, in which the bushings 4 have been inserted, adjacent the tapered portions of the adapter sleeve 2. The adapter sleeve nuts 7 are then screwed onto the adapter sleeve and into engagement with the flanges 5 on the bushings, thus forcing the bushings and the bearings 6 inwardly toward the housing 3. As the tapered portions of the bushings engage the tapered portions of the sleeves, the latter are forced inwardly and tightly engage the shaft, while the bushings are slightly expanded, thus insuring a tight fit with the inner bearing races. The frictional engagement between the shaft and the adapter sleeve, between the adapter sleeve and the bushings and between the bushings and the inner races is then such as to insure rotation of the latter with the shaft and to prevent any play or lost motion between these parts.

When the sleeve has been clamped tightly to the shaft by means of the tightening of the adapter sleeve nuts 7, the latter are then secured permanently in position upon the adapter sleeve by tightening the set screws 8 which engage the sleeve at the portions from which the thread has been cut away.

For enclosing the ends of the housing 3, I provide the detachable end pieces 10 which may be of any convenient form having cylindrical portions 11 of diameter very slightly larger than the outer diameter of the outer races of the bearings 6, and otherwise of such diameter as not to interfere with free rotation of the shaft and moving parts attached thereto. The annular grooves 12 in the outer ends of the end pieces 10 are provided with annular felt rings 13 or other suitable packing to exclude admission of foreign substances to the interior of the bearings and to prevent the escape of lubricant along the shaft. The end pieces 10 are secured to the housing body 3 by bolts 14 extending through the end pieces at spaced intervals and through a flange 15 provided on the central housing, the bolts being retained by nuts 16. It will be understood, however, that although I have shown a bearing employing three such bolts and nuts at each end, a greater or less number may be employed, or the end pieces 10 may be detachably mounted on the housing in any other convenient way, as by screw threading or otherwise, as desired.

As the end pieces are in my invention removably secured to the central portion of the housing, they may readily be moved outwardly along the shaft as indicated by broken lines in the drawings, when cleaning, inspection or lubrication of the bearing is required or when for any other reason access to the bearing is desired, the manner and position in which the bearings are mounted upon the adapter sleeve permitting free access to the rolling elements from all sides without requiring removal from the sleeve.

In Fig. 3 I have shown a modified form of my invention in which is employed a bearing assembly having a specially formed inner race whereby the bushing 4 may be dispensed with, but otherwise of similar form and operation. The inner race of the bearing 6' is internally tapered to correspond with the taper of the adapter sleeve 2' and bears directly upon the sleeve when the adapter sleeve nut 7' is drawn up to clamp the sleeve to the shaft. The adapter sleeve nut is then secured to the sleeve by means of a set screw as above described.

In the modified form of my invention shown in Fig. 4 I employ at each end of the housing an adapter sleeve 17, an adapter sleeve nut 18, and a bushing 19 mounted on the shaft 20, which, as shown, may be of exactly the same form as corresponding parts employed in the hereinabove described preferred form of the invention. As I have shown in Fig. 4, however, a bearing which is peculiarly adapted for employment with roller bearings as distinguished from ball bearings, other parts are preferably of somewhat different structure, as such bearings are usually employed in circumstances in which some end thrust on the shaft is encountered. I therefore employ a housing member 21 provided with an annular rib 22 adapted to engage the inner race of the roller bearing assembly 23. It will be understood that the roller bearing assembly 23 is of the usual form for tapered roller bearings, comprising an inner race, an outer race and frusto-conical rolling elements, disposed therebetween and maintained in spaced relation with the aid of a suitable retainer ring, and also that it is desirable that provision be made for effecting relative axial adjustment between the races to permit wear to be taken up, and to prevent binding. It is, of course, apparent that the engagement between the rib 22 and the inner bearing race must be sufficiently free to permit the free relative rotation of the inner race. In the form of my invention shown in Fig. 4 I have therefore provided an end piece 24 which is mounted on the housing 21 by screw threading as shown, an internal annular shoulder 25 being provided to engage the outer race to permit axial adjustment between the races as the end piece is screwed onto the housing. In the screw threaded portion of the end piece 25 I provide an arcuate slot 26 extending circumferentially of the end piece for a sufficient distance to permit the portions separated by the slot to be slightly drawn together when the screw 27 is tightened, thereby effecting a tight frictional engagement between the respective threads on the housing 21 and on the end piece 24 whereby any tendency of the end piece to become unscrewed from the housing or loosened thereon may be avoided. Thus it will be readily understood that when the bearing is mounted on the shaft suitable adjustment between the races can easily be made by screwing the end piece a proper distance upon the housing, after which the end piece is locked in position by the tightening of the screw 27. As the adjustment between the races depends upon the distance the end piece is screwed upon the housing the exact adjustment may be restored after the bearing has been taken apart for cleaning, inspection or for any other reason by simply restoring the end piece to the same position on the housing, which may readily be accomplished if the position of the end piece on the housing has been noted before removal thereof.

In the further modified form of my invention shown in Fig. 5 I provide the end piece 24' of similar construction to those employed in my preferred form and which may be mounted on the housing 21' by bolts 28 in a similar manner, as I have found that convenient adjustment of the races of the roller bearing 23' illustrated as being employed in this form of the invention may be obtained with the aid of a plurality of arcuately spaced adjusting screws 29 threaded into the end piece at suitable points to engage the outer bearing race, and while I have shown six such adjusting screws in the drawings it will be understood that a greater or less number may be used as desired. As in this form of the invention the position of the adjusting screws need not be disturbed when the end piece is removed for access to the bearing, to restore the bearing to operative position thereafter it is necessary merely to restore the end pieces to position on the housing and replace the bolts 28, which are here shown screw threaded into the housing 21' but which may be secured thereto with the aid of nuts as in the preferred form if desired.

It will thus be understood that I have provided in my invention means whereby access to bearings may easily be had without removal of the rolling elements or races from the shaft or any alteration of their position thereon. Thus, the necessity for readjustment of the bearings after cleaning, inspection or lubrication is entirely obviated, the only operation necessary being to return the end pieces along the shaft to the housing and to secure the end pieces thereto as hereinabove described, after which normal operation of the bearing may be resumed.

As will be clearly understood from the foregoing description, the outer race of the bearing assembly is firmly supported within the end pieces when the same are secured in position upon the central body housing and thus the shaft freely rotates upon the antifriction bearings.

While I have described my invention with reference to its application to a line shaft, it is not contemplated that it shall be confined thereto, for the same construction may be used with equal facility on other forms of shafts or may be used in any other embodiments where free rotation between a shaft and another body is desired as in a loose pulley or the like, in which case the housing 3 is supplanted by the hub of the loose pulley. Many other applications of my invention will be clearly understood by those skilled in the art and variations in the form and relationship of the parts as hereinabove described may be employed without departing from the spirit and scope of the appended claims.

Having thus described my invention, I claim and desire to protect by Letters Patent of the United States:

1. In a bearing of the class described, a housing comprising a separate central portion, end pieces adapted to be supported thereon, and antifriction bearings comprising outer races, inner races and rolling elements disposed therebetween, adapted to be supported within said end pieces and axially outwardly of said central portion and to support a shaft maintained in non-rotatable relation to said inner races.

2. In a bearing of the class described, a shaft, antifriction bearings disposed in spaced relation on said shaft, a central housing member disposed between said bearings and surrounding the shaft, end caps adapted to support said bearings outwardly of the ends of said housing member and means for securing said end caps to said housing member.

3. In a bearing of the class described, a shaft, antifriction bearings disposed in spaced relation on said shaft, a housing surrounding said shaft and providing annular spaces between said bearings and the respective adjacent ends of the housing, and end caps adapted to abut said housing to thereby enclose said annular spaces and operative to maintain said antifriction bearings in axially spaced relation to said housing.

4. In a bearing of the class described, a shaft, antifriction bearings disposed in spaced relation on said shaft, a central housing member disposed between said bearings and surrounding the shaft, externally threaded flanges integral with said housing member adjacent its ends, and end caps operative to support said bearings outwardly of the ends of the housing member, each having a threaded portion adapted to receive one of said threaded flanges, and means bridging a slot in said threaded portion operable to effect frictional locking engagement between said threaded portion and the flange received thereby.

5. In combination with a rotatable shaft, a circumferentially discontinuous substantially cylindrical adapter sleeve surrounding the shaft, said sleeve having a tapered portion and a threaded portion adjacent each of its ends, internally tapered bushings respectively cooperative with said tapered portions, antifriction bearings having inner races in engagement with said bushings, a nut cooperable with each of the threaded portions of the sleeve to clamp the shaft, sleeve, bushings and inner races together in non-rotatable relation, an end cap adapted to receive the outer race of each of said anti-friction bearings, and a housing member interposed between said antifriction bearings and operative to receive and support said end caps.

In witness whereof I have hereunto set my hand this 25th day of October, 1929.

JAMES BOWEN.